(12) United States Patent  
Duret

(10) Patent No.: US 7,983,875 B2  
(45) Date of Patent: Jul. 19, 2011

(54) METHOD FOR DETERMINING A RUNNING CONDITION BY SPATIAL HARMONIC ANALYSIS OF SPEED

(75) Inventor: Christophe Duret, Quintal (FR)

(73) Assignee: S.N.R. Roulements, Annecy (FR)

( * ) Notice: Subject to any disclaimer, the term of this patent is extended or adjusted under 35 U.S.C. 154(b) by 554 days.

(21) Appl. No.: 11/631,627

(22) PCT Filed: Jul. 4, 2005

(86) PCT No.: PCT/FR2005/001710  
§ 371 (c)(1),  
(2), (4) Date: Mar. 14, 2007

(87) PCT Pub. No.: WO2006/013278  
PCT Pub. Date: Feb. 9, 2006

(65) Prior Publication Data  
US 2008/0033689 A1    Feb. 7, 2008

(30) Foreign Application Priority Data  
Jul. 6, 2004 (FR) ...................................... 04 51461

(51) Int. Cl.  
*G06F 11/07* (2006.01)
(52) U.S. Cl. ......... 702/182; 702/179; 702/183; 702/185
(58) Field of Classification Search ................... 702/96, 702/113, 145, 147, 182, 183, 185, 188, 189; 73/117.3, 118.1; 123/419; 324/143; 701/111  
See application file for complete search history.

(56) References Cited

U.S. PATENT DOCUMENTS

| | | | | |
|---|---|---|---|---|
| 5,313,826 A * | 5/1994 | Klauber et al. | ............ | 73/114.15 |
| 5,753,804 A * | 5/1998 | La Palm et al. | ............ | 73/114.04 |
| 5,806,014 A * | 9/1998 | Remboski et al. | ............ | 701/111 |
| 6,006,155 A * | 12/1999 | Wu et al. | ........................ | 701/111 |
| 6,158,273 A * | 12/2000 | Jeremiasson et al. | ....... | 73/114.02 |
| 6,993,439 B2 * | 1/2006 | Grosjean | ........................ | 702/66 |
| 2006/0243895 A1 * | 11/2006 | Nordenfelt et al. | ...... | 250/231.13 |

FOREIGN PATENT DOCUMENTS

WO         00/01545 A        1/2000

* cited by examiner

*Primary Examiner* — Mohamed Charioui  
*Assistant Examiner* — Felix E Suarez  
(74) *Attorney, Agent, or Firm* — Arent Fox, LLP

(57) ABSTRACT

The invention concerns a method for determining the running condition of a member rotating on a surface. The method includes an initial process of performing a spatial frequency analysis of the rotational speed of the member to identify at least one frequency window not including a harmonic of the revolution of the member wherein a law determining the running condition is established, and thereafter, an iterative process for determining the running condition including measuring the rotational speed V of the member; spatially sampling the speed with a constant spatial sampling period $\Delta d$; and analyzing the sampled signal in the frequency window identified so as to determine the running condition on the basis of the established law.

19 Claims, 6 Drawing Sheets

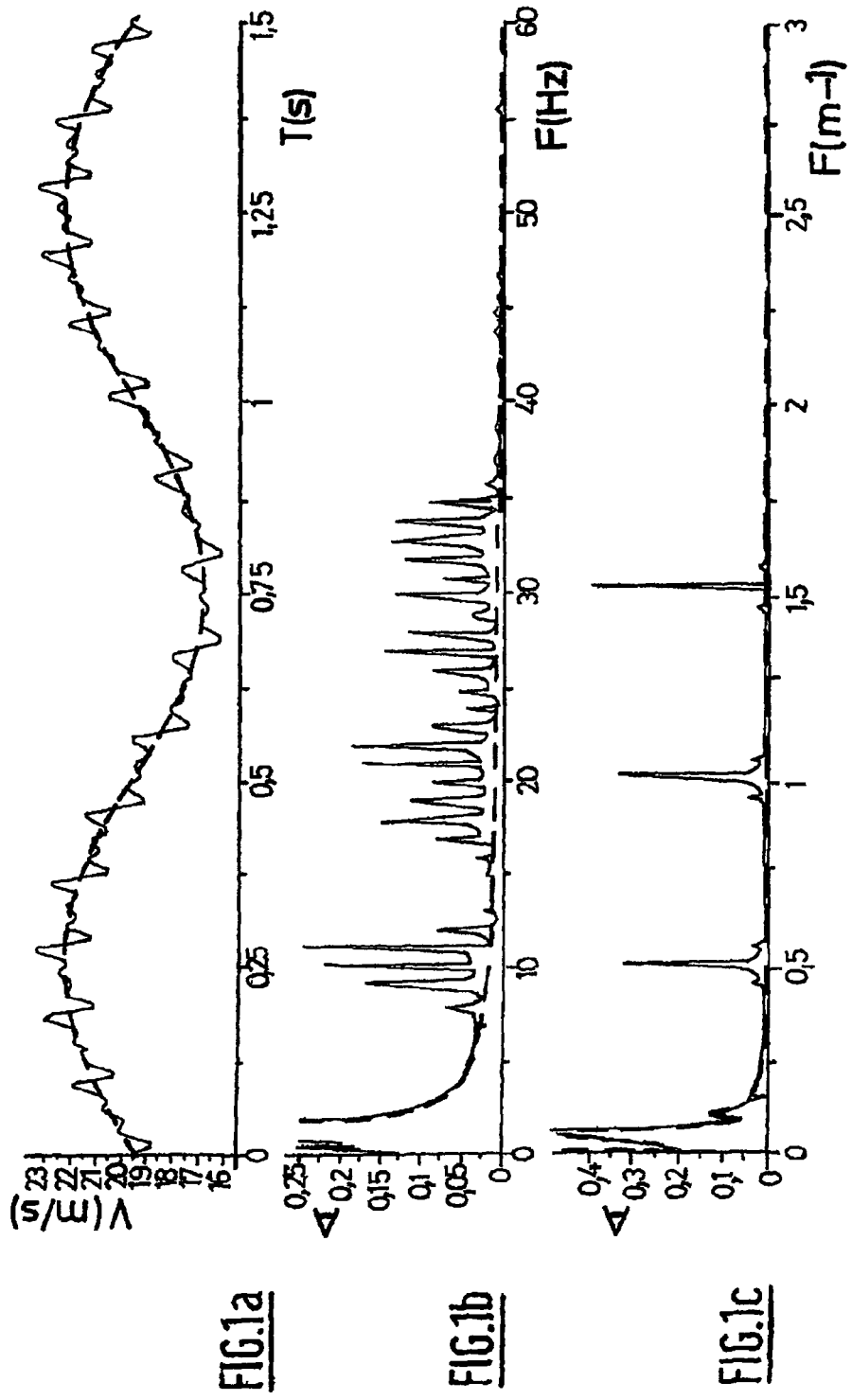

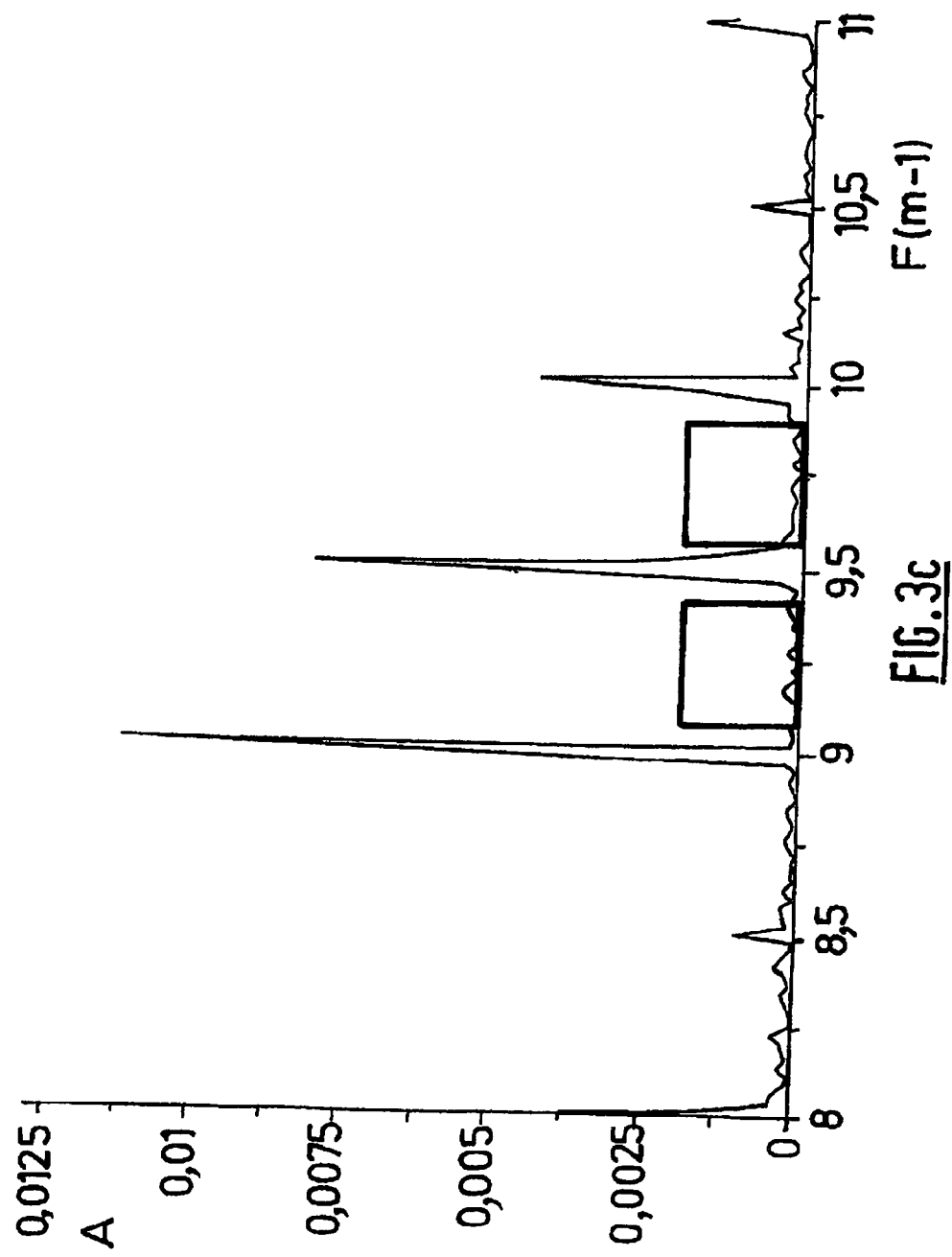

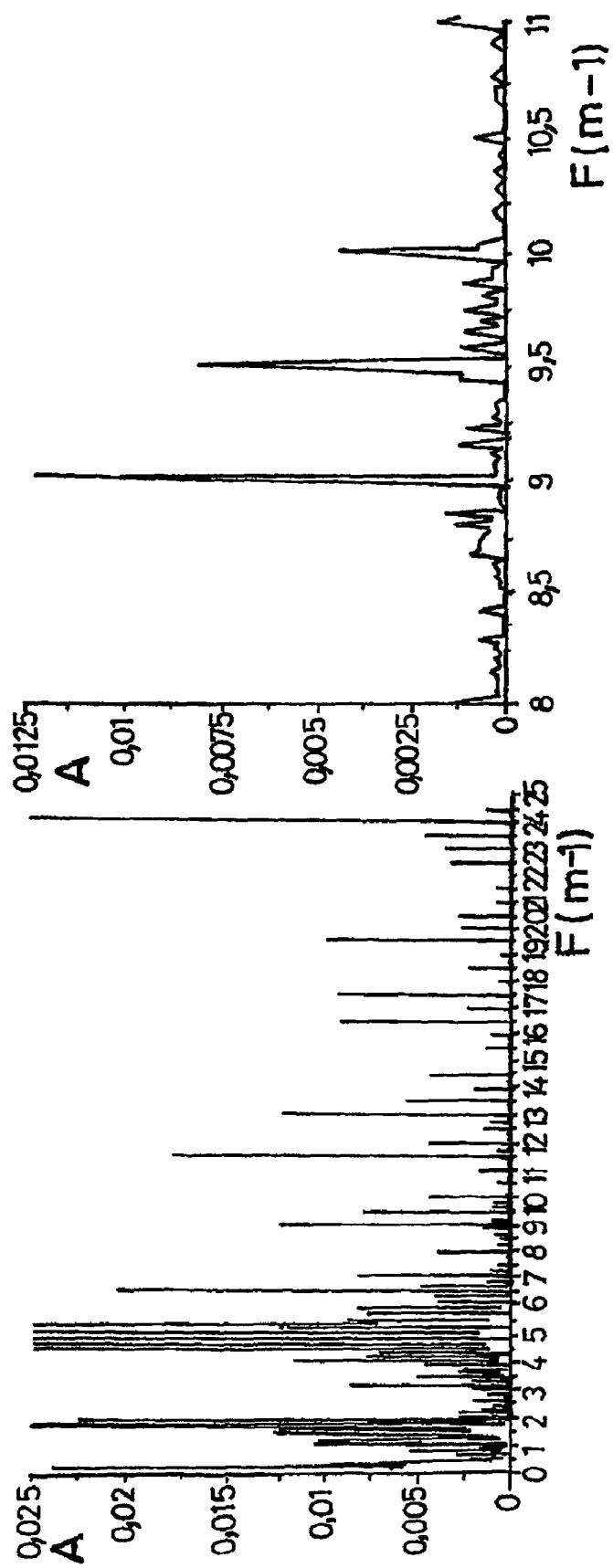

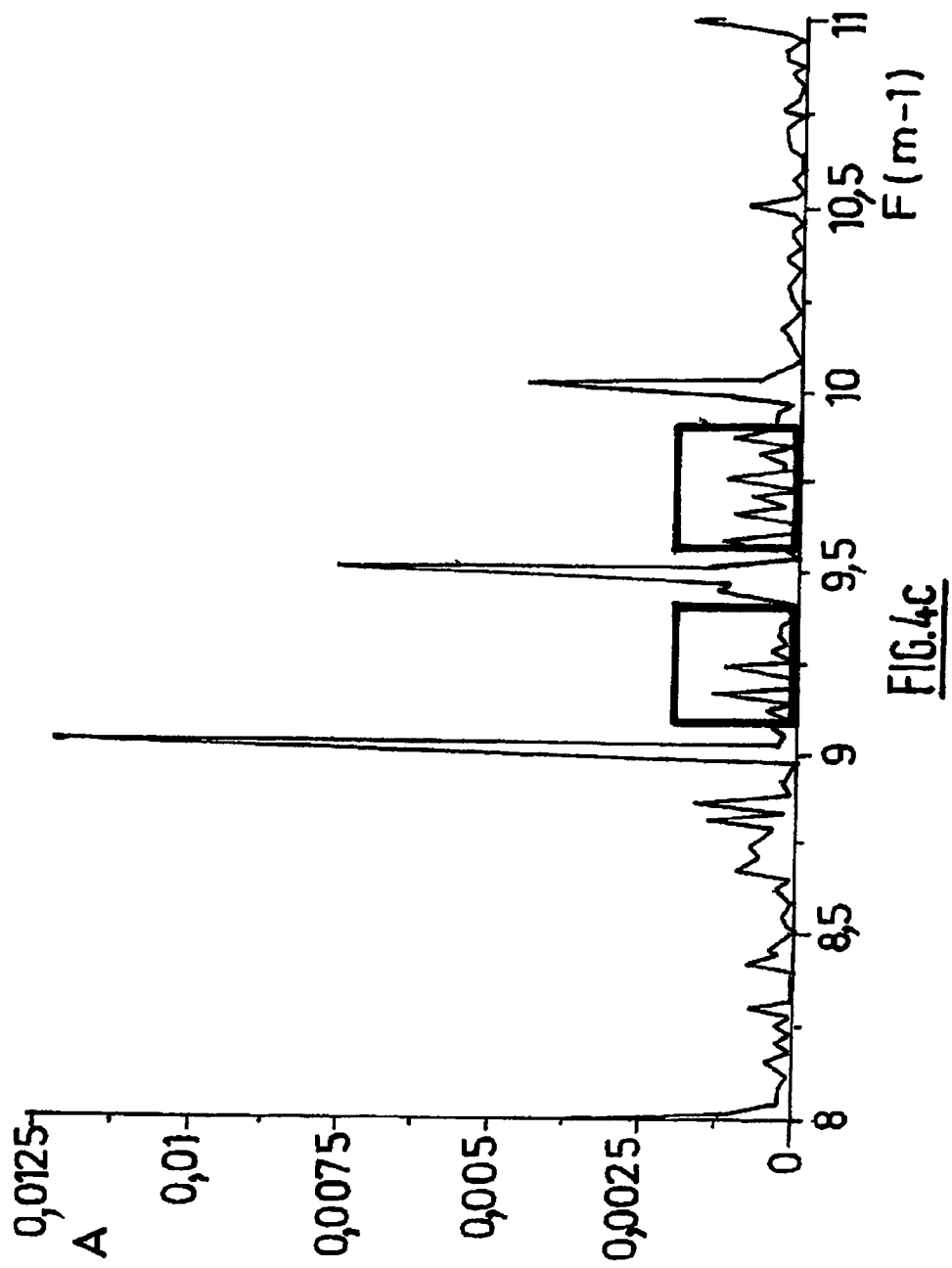

METHOD FOR DETERMINING A RUNNING CONDITION BY SPATIAL HARMONIC ANALYSIS OF SPEED

CROSS-REFERENCE TO RELATED APPLICATIONS

This application is a National Stage entry of International Application Number PCT/FR2005/001710, filed Jul. 4, 2005, and claims the priority of Application Number 0451461, filed Jul. 6, 2004, in France. The disclosures of the prior applications are hereby incorporated herein in their entirety by reference.

The invention relates to a method of determining a rolling condition of a member rotating on a surface.

BACKGROUND OF THE INVENTION

It applies typically to determining at least one rolling or "running" condition of a motor vehicle tire on the ground. In particular, the rolling conditions determined can be used to determine states or parameters of the bonding at the interface between the tire and the ground, such states or parameters serving in particular for implementation in systems for controlling the dynamics of the vehicle, such as, for example, an Anti-lock Braking System (ABS) or an Electronic Stability Program (ESP).

In order to determine a rolling condition, it has been proposed to analyze how the speed of rotation of the tire changes, in particular by comparing the variations in the respective speeds of rotation of the two wheels on the same axle. However, that determination strategy is not satisfactory, in particular due to its relative nature, but also due to the large number of parameters influencing the relative speeds of the wheels on the same axle (e.g. cornering). Therefore, the reliability and the accuracy of the rolling condition that is determined are, in particular, not compatible with application in a dynamic safety system of the vehicle.

In order to improve that determination strategy, it has been proposed to analyze the speed of rotation of the tire temporally so as to identify a law for determining a rolling condition. Unfortunately, that strategy does not make it possible to solve the above-mentioned problems, in particular due to the fact that the law is heavily dependent on the variations in the speed of rotation.

It is also known, from Document WO-A-00/01545, that a method exists for detecting a flat-tire rolling condition of a tire of a vehicle. In that method, the angular speed of rotation of the wheel is analyzed by spatial Fourier transform so as to use the variations in energy in the vicinities of the harmonics of the rotation. Although that strategy makes it possible to overcome the constraints inherent to temporal analysis, it does not make it possible to obtain satisfactory reliability in determining the flat-tire rolling condition.

SUMMARY AND OBJECT OF THE INVENTION

As observed by the Applicant on designing the present invention, and as explained below, the variations in energy in the bands of the spectrum that are centered around the harmonics depend on a large number of parameters. In particular, among such parameters, some are independent of the rolling condition, such as the characteristics of the measurement chain or the characteristics of the tire, and that considerably degrade the unambiguous nature of the relationship between variations in energy and change in rolling condition. Therefore, when implementing the method of Document WO-A-00/01545, an energy variation, even a significant energy variation, does not necessarily imply a change in the rolling condition, and that considerably degrade the reliability of the determination of the rolling condition.

A particular object of the invention is to solve the above-mentioned problems by proposing a method of determining a rolling condition of a rotary member rotating on a surface, this determination being made independent of the speed of rotation of the member and of changes in interference parameters so that it is possible to determine the rolling condition accurately and reliably.

To this end, and in a first aspect, the invention provides a method of determining a rolling condition of a rotary member rotating on a surface, said method comprising an initial procedure for performing spatial frequency analysis of the speed of rotation of the member so as to identify at least one frequency window not including a harmonic of the revolution of the member, in which window a law for determining the rolling condition is established, and an iterative procedure for determining the rolling condition and comprising the following steps:

measuring the speed of rotation V of said member;
spatially sampling said speed with a constant spatial sampling period $\Delta d$; and
analyzing the signal sampled in the identified frequency window so as, as a function of the established law, to determine the rolling condition.

In a second aspect, the invention provides the use of such a determination method in determining at least one rolling condition of a tire of a motor vehicle rolling on the ground.

BRIEF DESCRIPTION OF THE DRAWINGS

Other objects and advantages of the invention appear from the following description given with reference to the accompanying drawings, in which:

FIG. 1a shows the curve of variation in the speed of rotation V of a wheel as a function of time T, respectively in an ideal case when the curve is a sinewave having a frequency of 1 Hz about the mean speed (curve plotted as a dashed line), and in a case when three faults of the same amplitude and appearing respectively once, twice, and three times per revolution have been introduced (curve plotted as a solid line);

FIGS. 1b and 1c are respectively temporal and spatial Fourier transform spectra of the curves of FIG. 1a showing the variation in the amplitude A as a function of frequency F;

FIGS. 3a to 3c are spatial Fourier transform spectra of a signal representing speed of rotation of a wheel, at respective ones of three different scales, in a "normal surface" rolling condition; and FIGS. 4a to 4c are spectra analogous to those of FIGS. 3a to 3c, in a "coarse-grain surface" rolling condition.

DETAILED DESCRIPTION OF THE INVENTION

Figure 2A:
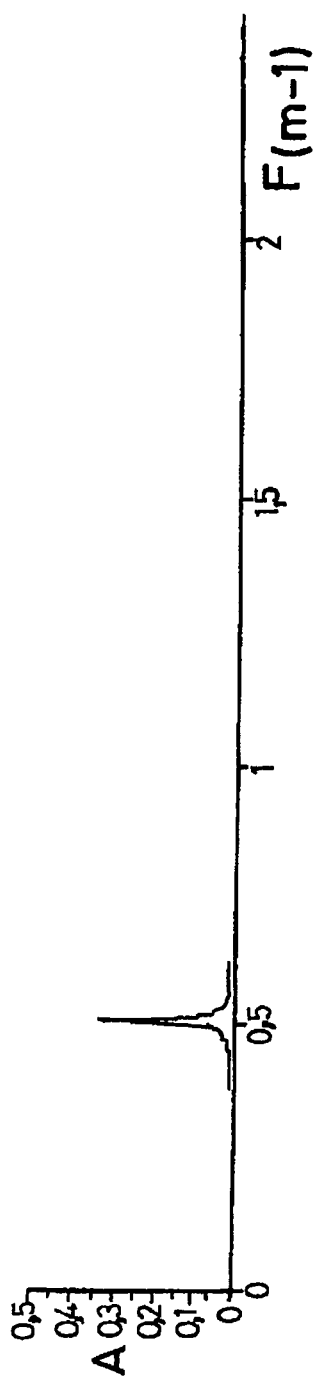
FIGS. 2a to 2c are spatial Fourier transform spectra showing the variation in the spectrum line corresponding to the first harmonic of the rotation of a wheel, as a function of respective ones of three amplitudes of a fault appearing once per revolution of the wheel.

The invention relates to a method of determining a rolling condition of a rotary member rotating on a surface, in particular a motor vehicle wheel rotating on the ground.

In many applications, in particular systems for controlling the dynamics of the vehicle such as, for example, ABS or ESP, it is useful to determine the rolling conditions so as, in particular, to adapt the intervention of those systems as a function of said conditions.

In particular, the rolling conditions can concern the state of the wheel and/or of the tire, the state of the road surface, or the interaction between tire and ground. In addition, the rolling conditions determined in accordance with the invention can be of the quantitative type, i.e. in the form of a state that is, in general, binary, or of the qualitative type, i.e. in the form of a parameter.

By way of example, mention can be made of the following rolling conditions:
- pressure of the tire;
- adherence of the road surface, sometimes also known as "coefficient of friction";
- forces or moments applied at the tire/ground interface;
- steering wheel angle;
- yaw angle;
- angle of drift of the tire relative to the plane of the wheel;
- slippage of the driven wheels relative to the non-driven wheels;
- difference in speed of two wheels on the same axle;
- eccentricity of the rolling assembly comprising the encoder, the wheel, and the tire;
- levels of vibration or of oscillation of the engine of the vehicle and of the transmission thereof;
- the state of the road surface (sheet of ice, puddle of water, oil slick, dust, surface state, etc.);
- puncture of the tire;
- state of wear of the tire;
- tire or wheel mounted wrongly;
- adjustment of the set of wheels on the same axle (wheel camber or rake).

Depending on the specific needs of the application in question, the invention proposes a strategy for indirectly determining at least one rolling condition and that makes provision to perform an initial procedure for identifying and modeling the influence of the rolling condition on the speed of rotation of the wheel, and then to perform an iterative procedure for determining the rolling condition.

The initial procedure makes provision for spatial harmonic analysis of the speed of rotation of the wheel. In one implementation, this analysis is performed by:
- measuring the speed of rotation V of the wheel;
- spatially sampling said speed with a constant spatial sampling period $\Delta d$; and
- calculating the spatial Fourier transform of the sampled signal so as to obtain the spectrum of the speed of rotation of the member.

Thus, spatial harmonic analysis makes it possible to extract the individual spatial frequencies from the speed signal and to assign a respective amplitude to each of them.

FIG. 1a shows, as a dashed line, the curve representing variation in a speed V that is a sinewave having a frequency of 1 Hz about the mean speed, and, as a solid line, the same curve in which three faults of the same amplitude and appearing respectively one, two, and three times per revolution have been introduced.

FIG. 1b shows the temporal Fourier transform spectra of the curves of FIG. 1a. In these spectra it can be observed that the introduction of the faults leads to the appearance throughout the spectrum of multiple spectrum lines of non-negligible amplitude. Therefore, this spectrum is difficult to interpret for the purpose of establishing a law of determination of a rolling condition, in particular due to the difficulty of de-correlating the variations in the lines of the spectrum that are due to the faults from those that are induced by alteration of the rolling condition. In addition, the temporal analysis is limited because numerous phenomena appear at a frequency that is a multiple of the frequency of the wheel and, if said frequency of rotation of the wheel varies over time, that gives rise to broadening, multiplication, and/or overlapping of the characteristic spectrum lines. In addition, in the context of temporal analysis, the frequency resolution of the resulting spectrum is necessarily coarse because the number of points of the speed signal acquired must be small in order to limit the effects of the variations in the speed of the vehicle during acquisition.

The invention thus proposes to perform spatial harmonic analysis as shown in FIG. 1c which shows the spatial Fourier transform spectra of the curves of FIG. 1a. It can be observed that the lines of these spectra are fine and localized, which makes them easier to interpret. The first spectrum line (harmonic 1) corresponds to the fault appearing once per revolution of the wheel (with the circumference of the wheel being taken as equal to 2 meters (m), the spatial frequency of this spectrum line is $0.5\text{ m}^{-1}$), the second spectrum line (harmonic 2) corresponds to the fault appearing twice per revolution of the wheel, etc.

Figure 2B:
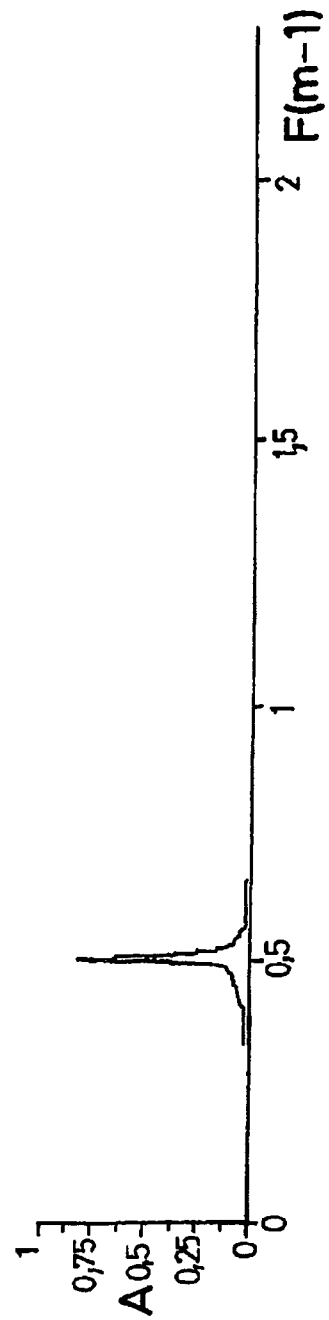
Figure 2C:
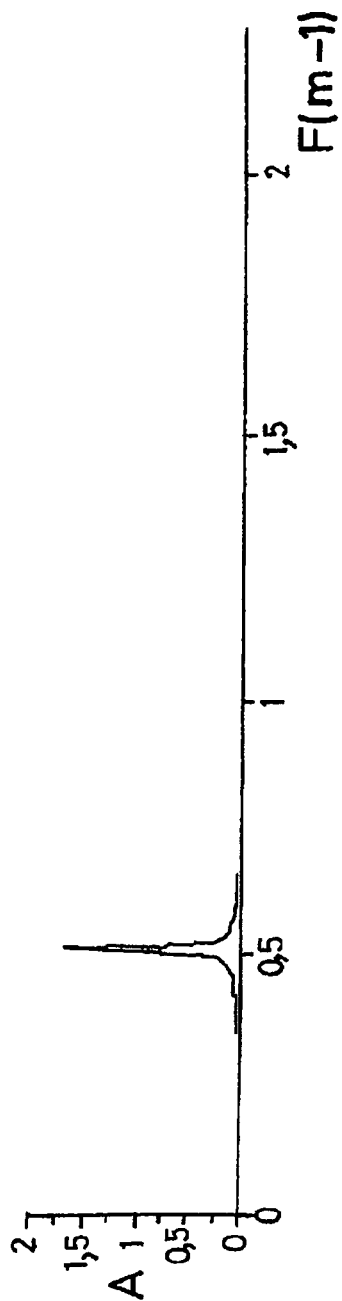

However, the amplitude of the harmonic lines is proportional to the amplitude of the corresponding fault. FIGS. 2a, 2b, and 2c show the amplitude of harmonic 1 as a function of respective ones of three amplitudes of the fault appearing once per revolution of the wheel. Therefore, the Applicant has shown that variation in the amplitudes of the harmonic lines cannot be correlated reliably with change in the rolling condition since the appearance or variation of periodic faults—in particular in the measurement chain comprising the engine, the transmission, the tire, the mounting of the wheel, the bearing, the encoder, and the sensor—interferes with the variation in the amplitudes of the harmonic lines.

The invention thus proposes, during the initial procedure, to identify at least one frequency window not including a wheel revolution harmonic and in which a law for determining the rolling condition can be established. Thus, the variation of the spectrum in said window is independent of the faults and can thus be correlated simply with the change in the rolling condition.

Figures 3A, 3B:
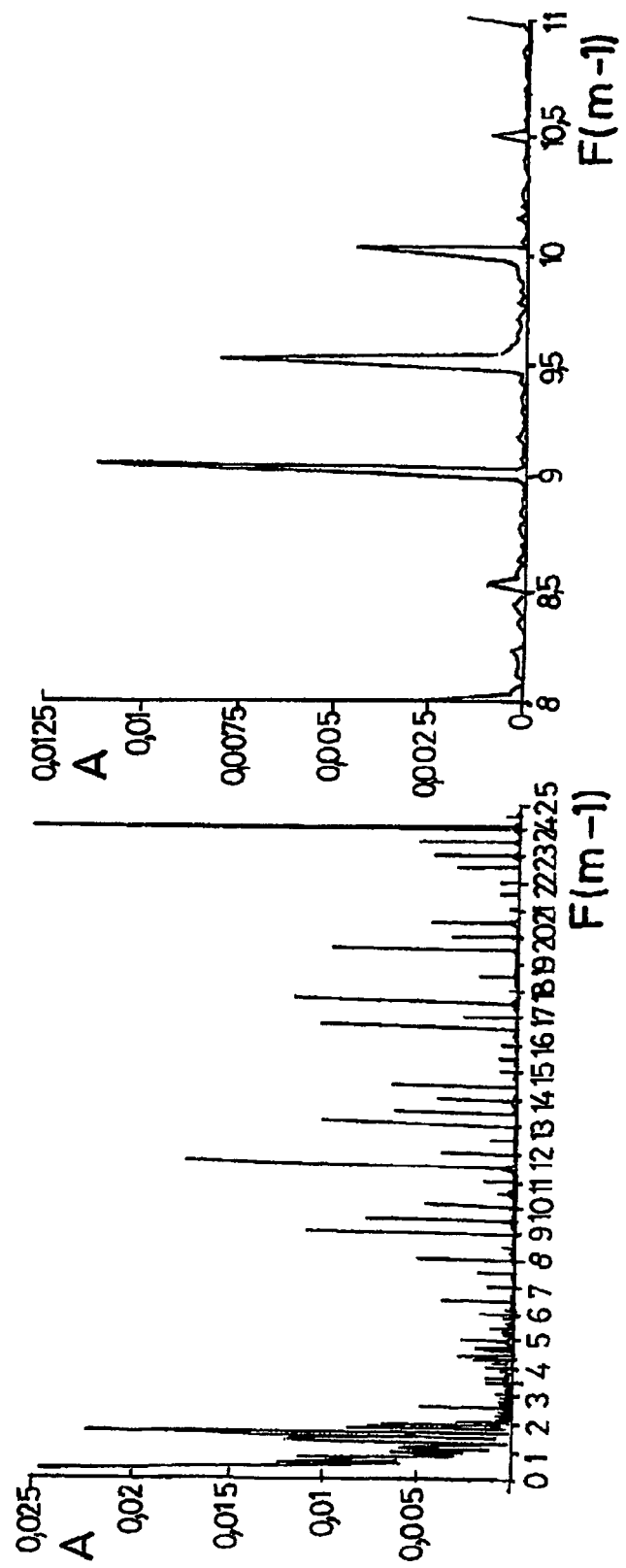

With reference to FIGS. 3 and 4, a description follows of the initial procedure when the rolling condition is a surface state of the road surface and can take two values: "normal surface" or "course-grain surface" as a function of the size of the agglomerates of the surface on which the wheel is rotating.

In this implementation, spatial frequency analysis of the speed of rotation of the wheel comprises a spatial Fourier transform of the speed signal when the wheel is rotating on a surface of the "normal" type (FIG. 3) and a spatial Fourier transform of the speed signal when the wheel is rotating on a surface of the "course-grain" type (FIG. 4). For example, the two types of speed signals can be acquired during a test phase on surfaces of known types, by measuring the speed of rotation of the wheel and by spatially sampling said speed with a constant spatial sampling period $\Delta d$.

Then by comparing the two spectra of FIGS. 3 and 4, it is possible to identify at least one frequency window not including a wheel revolution harmonic in which significant differences can be observed. Thus, as shown above, it is possible to correlate such differences with the change of state in the rolling condition. In the example given, two windows are identified, respectively between 9.1 and $9.4\text{ m}^{-1}$ and between 9.6 and $9.9\text{ m}^{-1}$ (on the assumption that the circumference of the wheel is equal to 2 m, i.e. that the harmonics are disposed every $0.5\text{ m}^{-1}$). In said windows, it is observed that the total energy of the signal (obtained by integrating or averaging the amplitude of the spectrum) is greater in the "course-grain surface" state than in the "normal surface" state. Therefore, it is possible to establish a law of determination, in the present case a threshold value for the energy of the signal in each of the windows, beyond which threshold value the "coarse-grain surface" state is determined reliably.

In a variant, and for the purpose of further increasing reliability in determining the rolling condition, it is possible to make provision for the determination law to be established as a function of at least one value coming from each of the windows. In the example in question, the above-mentioned energy threshold value can be equal to a combination of the threshold values established in each of the windows.

In another implementation, it is possible to make provision to establish a determination law comprising a behavior law making it possible to determine at least one rolling condition. Thus, in the above-described example, the behavior law could be the variation in the adherence of the road surface as a function of the energy of the spectrum in the identified window(s).

In another example, it is possible to identify at least one frequency window in which the energy of the signal varies as a function of the pressure of the tire. It is thus possible to establish a behavior law: pressure of the tire as a function of the energy in the window(s), so as to determine the pressure of the tire by implementing the method of the invention.

In another implementation, it is possible to choose to identify at least one window not including a wheel revolution harmonic and at least one window including a wheel revolution harmonic. In particular, this implementation makes it possible to determine rolling conditions that are periodic, i.e. that appear mainly at the harmonics. However, by making provision for combining the above-mentioned frequency windows, the invention makes it possible, at the harmonics, to de-correlate the respective contributions from the periodic faults and from the variation in the rolling condition, by using a determination law that also takes account of at least one value coming from a window not including a harmonic. Thus, it is, for example, possible to determine reliably conditions such as the eccentricity of the encoder relative to the sensor, the ovality (out-of-roundness) of the tire and wheel assembly or the poor state of balancing of the wheel, which conditions include a variation in amplitude of the harmonic 1 since they appear once per revolution of the wheel.

As mentioned above, the initial procedure can be implemented by measuring and by sampling the speed of the wheel during rolling tests under known conditions, so as to establish the desired determination laws. Then, the determination law (s) can be recorded in a specific or host computer so as to be used subsequently.

To this end, after establishing the determination law, the method makes provision for an iterative procedure for determining the rolling condition, which procedure makes provision for the following steps:
measuring the speed of rotation V of said member;
spatially sampling said speed with a constant spatial sampling period $\Delta d$; and
analyzing the signal sampled in the identified frequency window so as, as a function of the established law, to determine the rolling condition.

In the example described with reference to FIGS. 3 and 4, the energy of the signal sampled in the two frequency windows is thus compared iteratively with the threshold value(s), so as to determine the "normal surface" or "coarse-grain surface" rolling condition.

In one implementation, during the determination procedure, and during the initial procedure, the measuring and the sampling of the speed is performed by means:
of an encoder that is constrained to rotate with the member, said encoder being provided with a multi-pole track; and
of a stationary sensor provided with at least two sensitive elements that are disposed facing and at reading distance from the multi-pole track, said sensor being arranged to deliver the spatially sampled speed signal.

In a particular example, the encoder is formed of a multi-pole magnetic piece on which a plurality of pairs of North and South poles are magnetized that are distributed uniformly with a constant angular width. For example, the encoder can, in known manner, be secured to the rotary ring of the bearing on which the wheel is mounted.

By disposing at airgap distance from the encoder at least two sensitive elements, e.g. formed by a Hall-effect probe or by a magnetoresistor, the sensor can, in known manner, deliver a signal representing the speed of the wheel relative to the chassis, said signal being sampled spatially with a constant period $\Delta d$ which is a function of the angular width of the magnetic poles. In particular, Document FR-A-2 792 380 describes a bearing provided with an encoder and with a sensor that are arranged to deliver a speed signal adapted to implementing the method of the invention.

In one implementation, the sampled speed signal is interpolated so as to increase its spatial resolution, such interpolation being, for example, described in Document FR-2 754 063. In this implementation, the observable frequency zone is enlarged, thereby making it possible to identify the frequency window(s) from among a larger number of possibilities. In a particular example, when the encoder has 48 pairs of poles and when the interpolation factor is 32, the maximum frequency that can be reached is 1550 $m^{-1}$ (when the circumference of the wheel is equal to 2 m). Thus, a phenomenon of a spatial period greater than 0.6 mm which would disturb the speed of the wheel would be susceptible of being detected and thus, by implementing the method of the invention, occurrence of that phenomenon could be determined as a rolling condition.

Four implementations of the analysis of the signal sampled during the iterative procedure are described below. In these implementations, the speed signal can be sampled with a number of points corresponding to 10 wheel revolutions.

In the first implementation, this analysis comprises:
calculating the spatial Fourier transform of the sampled signal so as to obtain the spectrum of the speed of rotation of the member; and
in the identified frequency window, applying the determination law as a function of at least one characteristic value of the spectrum, in particular the energy of the spectrum.

Therefore, in this implementation, the analysis of the signal during determination is of the same type as the analysis performed during the iterative procedure.

In the second implementation, the analysis comprises:
calculating the spatial Fourier transform of the sampled signal so as to obtain the spectrum of the speed of rotation of the member;
filtering the spectrum, in the identified window, by removing the frequencies that are not of interest; and
applying the determination law as a function of at least one characteristic value of the filtered signal, said value being, in particular, representative of the energy of the filtered signal.

In a variant, prior to applying the determination law, the identified window is displaced towards the low frequencies and then the spatial signal is reconstructed at a lower sampling frequency (decimation) by techniques known to the person skilled in the art, in order to limit the quantity of calculations to be performed subsequently.

In both of the following embodiments, provision is made to use a digital filter whose passband corresponds to a frequency window identified during the initial procedure.

In the third embodiment, the analysis comprises:
digital filtering, in the identified window, of the sampled signal; and
applying the determination law as a function of at least one characteristic value of the filtered signal, said value being, in particular, representative of the energy of the filtered signal.

In this implementation, the sampled signal is firstly filtered so as to avoid iteratively calculating the spatial Fourier transform.

In the fourth implementation, the analysis comprises:
digital filtering, in the identified window, of the sampled signal;
calculating the spatial Fourier transform of the filtered signal; and
applying the determination law as a function of at least one characteristic value of the spectrum, said value being, in particular, representative of the energy of the spectrum.

In a variant, prior to the calculation, the identified window is displaced towards the low frequencies, and then the spatial signal is reconstructed at a lower sampling frequency (decimation) in order to limit the quantity of calculations to be performed subsequently.

The invention claimed is:

1. A method of determining a rolling condition of a rotary member rolling on a surface, said method comprising the following steps:
performing spatial frequency analysis of a speed of rotation of the rotary member to identify at least one frequency window not including a harmonic of a revolution of the rotary member, in which window a law for determining the rolling condition is established;
measuring the speed of rotation V of the rotary member rolling on the surface;
spatially sampling the speed of rotation V of the rotary member rolling on the surface during a constant spatial sampling period $\Delta d$ to generate a sampled rotation speed signal; and
analyzing the sampled rotation speed signal in the identified frequency window to determine the rolling condition as a function of the established law.

2. The method according to claim 1, wherein spatial harmonic analysis is performed by:
measuring the speed of rotation V of the rotary member;
spatially sampling the speed of rotation V of the rotary member during the constant spatial sampling period $\Delta d$; and
calculating a spatial Fourier transform of the sampled signal to obtain a spectrum of the speed of rotation V of the rotary member.

3. The method according to claim 1, wherein at least two frequency windows are identified, and wherein the law for determining the rolling condition is established as a function of at least one value selected from each frequency window.

4. The method according to claim 3, wherein at least one frequency window includes the harmonic of the revolution of the rotary member.

5. The method according to claim 1, wherein the law for determining the rolling condition comprises a threshold value used to determine at least one rolling state.

6. The method according to claim 1, wherein the law for determining the rolling condition comprises a behavior law used to determine at least one rolling parameter.

7. The method according to claim 1, wherein the law for determining the rolling condition is a function of energy of a spectrum in the identified frequency window.

8. The method according to claim 1, wherein spatially sampling the speed of rotation V of the rotary member is performed by:
an encoder constrained to rotate with the rotary member, said encoder being provided with a multi-pole track; and
a stationary sensor provided with at least two sensitive elements disposed to face the multi-pole track and at a reading distance from the multi-pole track, said stationary sensor configured to deliver the sampled rotation speed signal.

9. The method according to claim 8, wherein the sampled rotation speed signal is interpolated to increase a spatial resolution of the sampled rotation speed signal.

10. The method according to claim 1, wherein the step of analyzing the sampled rotation speed signal comprises the following steps:
calculating a spatial Fourier transform of the sampled signal to obtain a spectrum of the speed of rotation V of the rotary member; and
in the identified frequency window, applying the law for determining the rolling condition as a function of at least one characteristic value of the spectrum.

11. The method according to claim 1, wherein the step of analyzing the sampled rotation speed signal comprises the following steps:
calculating a spatial Fourier transform of the sampled signal to obtain a spectrum of the speed of rotation V of the rotary member;
digitally filtering the spectrum in the identified window; and
applying the law for determining the rolling condition as a function of at least one characteristic value of the filtered signal.

12. The method according to claim 11, wherein prior to the step of applying the law for determining the rolling condition, the identified window is displaced towards low frequencies.

13. The method according to claim 1, wherein the step of analyzing the sampled rotation speed signal comprises:
digital filtering, in the identified window, of the sampled rotation speed signal; and
applying the law for determining the rolling condition as a function of at least one characteristic value of the digitally filtered sampled rotation speed signal.

14. The method according to claim 1, wherein the step of analyzing the sampled rotation speed signal comprises:
digital filtering, in the identified window, of the sampled rotation speed signal;
calculating a spatial Fourier transform of the digitally filtered sampled rotation speed signal; and
applying the law for determining the rolling condition as a function of at least one characteristic value of a spectrum of the speed of rotation V of the rotary member.

15. The method according to claim 14, wherein prior to the step of calculating the Fourier transform, the identified window is displaced towards low frequencies.

16. The method according to claim 1, wherein the rotary member is a tire of a motor vehicle rolling on a surface, and the method determines at least one rolling condition of the tire.

17. A method for determining a rolling condition of a vehicle wheel rolling on a surface, said method comprising the following steps:

performing spatial frequency analysis of a speed of rotation of the wheel to identify at least one frequency window not including a harmonic of a revolution of the wheel, in which window a law for determining the rolling condition is established;

measuring the speed of rotation V of the wheel rolling on the surface;

spatially sampling the speed of rotation V of the wheel rolling on the surface during a constant spatial sampling period $\Delta d$ to generate a sampled rotation speed signal; and analyzing the sampled rotation speed signal in the identified frequency window to determine the rolling condition.

18. The method according to claim 17, wherein the vehicle is a road vehicle and the wheel is a tire, and wherein the rolling conditions concern at least one of a state of the tire, a state of the surface, and an interaction between tire and surface.

19. The method according to claim 18, wherein, the determined rolling condition includes at least one of the following conditions:

pressure of the tire;
adherence of the surface;
forces or moments applied at a tire-surface interface;
steering wheel angle;
yaw angle;
angle of drift of the tire relative to a plane of the tire;
slippage of driven tires relative to the non-driven tires;
difference in speed of two tires on a same axle;
eccentricity of a rolling assembly comprising an encoder and the tire;
levels of vibration or of oscillation of an engine of the vehicle and of a transmission thereof;
a state of the road surface;
puncture of the tire;
state of wear of the tire;
tire mounted incorrectly;
adjustment of a set of tires on the same axle.

* * * * *